United States Patent
Hsiao et al.

(10) Patent No.: US 7,593,630 B2
(45) Date of Patent: Sep. 22, 2009

(54) BUILT-IN MULTIDRIVER DEVICE FOR A CAMERA ZOOM LENS

(75) Inventors: Cheng-Fang Hsiao, Sijhih (TW); I-Sung Tsai, Jhunan Township, Miaoli County (TW)

(73) Assignee: Foxconn Technology Co., Ltd., Tu-Cheng, Taipei Hsien (TW)

( * ) Notice: Subject to any disclaimer, the term of this patent is extended or adjusted under 35 U.S.C. 154(b) by 469 days.

(21) Appl. No.: 11/491,660

(22) Filed: Jul. 24, 2006

(65) Prior Publication Data

US 2008/0019682 A1   Jan. 24, 2008

(51) Int. Cl.
*G03B 17/00* (2006.01)
*G03B 13/34* (2006.01)
*G02B 15/14* (2006.01)
*G02B 7/02* (2006.01)
*H02K 33/00* (2006.01)
*H02K 23/26* (2006.01)
*H02K 1/12* (2006.01)
*H02K 1/22* (2006.01)

(52) U.S. Cl. .................. 396/85; 396/133; 359/696; 359/824; 310/30; 310/208; 310/254; 310/261

(58) Field of Classification Search .................. 396/85, 396/75, 133; 359/696, 824; 310/80, 114, 310/184, 194, 208, 210, 254, 257, 261–263, 310/30

See application file for complete search history.

(56) References Cited

U.S. PATENT DOCUMENTS

2005/0036776 A1 *   2/2005   Yasuda et al. .................. 396/72

FOREIGN PATENT DOCUMENTS

| TW | M259423 | 3/2005 |
|---|---|---|
| TW | M274549 | 3/2005 |
| TW | M264500 | 5/2005 |

* cited by examiner

*Primary Examiner*—Rochelle-Ann J Blackman
(74) *Attorney, Agent, or Firm*—Frank R. Niranjan (57) ABSTRACT

The built-in multidriver device for a camera zoom lens has an independent driver for each lens of a zoom lens kit, and each driver is integrated into the lens mount. A housing positions each independent driver accordingly. The driver devices each include coil stators, magnetic rotors, fixed solenoids, inner solenoid bases, and limited units. The coil stators are placed in the housing, and the magnetic rotors are connected to the fixed solenoids. The inner solenoid bases are connected to the fixed solenoids, and the inner solenoid bases are limited and turned by the limiting units. When the magnetic rotor is turned by the magnetic induction of the coil stators, the fixed solenoid turns in the inner solenoid base, and the inner solenoid base is limited by the limiting unit. The inner solenoid base is moved axially, and the lenses inside are driven to zoom independently.

5 Claims, 7 Drawing Sheets

BUILT-IN MULTIDRIVER DEVICE FOR A CAMERA ZOOM LENS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to a camera zoom lens with a driver device, and more particularly to a built-in multidriver device that has an independent driver and integration for multiple lenses.

BACKGROUND OF THE INVENTION

The structure of a conventional camera lens places the driver on the outside of the lens mount, and it is driven by connecting the driving component. Because the source of the drive is equipped on one side, it needs other components placed inside the lens mount to assist the driving function to extend the lenses.

Because the driver must be placed on the external side of the lens mount, making the structure of the camera lens hard to match symmetrically, the special arrangement for lens to be placed on the camera is affected.

Because the driver is placed on one side of the lens mount, when zooming, it moves from side to side, which is not acceptable in today's digital market.

The driver needs other components to work, which increases the cost of the components and assembly, and it does not meet the preferred economic goals and price considerations.

The movement of the multiple lenses inside the zoom lens mount can focus automatically by the preset driving component. For multiple focus, soft focus, or a fuzzy effect, the driving component is not able to provide specific control to drive the lenses inside the lens mount.

Thus, to overcome the aforementioned problems of the prior art, it would be an advancement in the art to provide an improved structure that can significantly improve efficacy.

To this end, the inventor has provided the present invention of practicability after deliberate design and evaluation based on years of experience in the production, development and design of related products.

BRIEF SUMMARY OF THE INVENTION

The improvements of the present invention include integrating the drivers 30, 40, 60, a lens kit 10, and a housing 20. The housing 20 is provided for the independent drivers 30, 40, 60 to be positioned inside, and it is built symmetrically to increase the flexibility of the lens kit as well as achieving the effect of modular assembly.

When the drivers 30, 40, 60 are operating, the magnetic rotors 35, 45, 65, and the coil stators 31, 41, 61 are in all-directional relation, which creates stable operation.

The driver 30 comprises a coil stator 31, magnetic rotor 35, fixed solenoid 36, inner solenoid base 37, and limiting unit A. The driver 30 does not need additional driving components; therefore, the entire structure is connected in a circular shape. The assembly is simplified, and the assembly is made to be more effective.

The new effect created by the present invention includes each driver 30, 40, 60 being connected independently and integrated with lens kit 10 inside the housing to make independent sections. Each section controls the built in multidriver device independently, and by responding to demand for multi-sectional focus, soft focus, or fuzzy effect, the multidriver device offers lens kit 10 special independent control on each lens or lens group.

Because the multidriver device provides lens kit 10 with special independent control on each lens or lens group, each driver 30, 40, 60 can be operated and controlled digitally, which is more applicable as well as more compatible with different style zoom lens kit.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

As shown in FIGS. 1, 2, 3, and 4, there is a preferred embodiment of a built-in multidriver device for a camera lens. This embodiment is presented for descriptive purposes only. The scope of the invention is determined by the claims.

The built-in multidriver device for a camera lens of the embodiment has an independent driver 30, 40 for each lens 11, 12, 13, 15 of the zoom lens kit 10. Each driver 30, 40 is integrated into the lens mount, which makes the built-in multidriver device.

The device includes a housing 20, for each independent driver 30, 40 to be positioned accordingly.

A first driver device 30 comprises a coil stator 31, a magnetic rotor 35, a fixed solenoid 36, an inner solenoid base 37, and a limited unit A. The coil stator 31 is placed at the front section of the external end of the housing 20. The magnetic rotor 31 is connected to the fixed solenoid 36, and the inner solenoid base 37 is connected to the fixed solenoid 36. The inner solenoid base 37 is limited and turned by the limiting unit A, and a first lens 11 can be placed inside the inner solenoid base 37.

A second driver device 40 comprises a coil stator 41, a magnetic rotor 45, a fixed solenoid 46, an inner solenoid base 47, and a limited unit B. The coil stator 41 is placed at the middle section of the external end of the housing 20. The magnetic rotor 41 is connected to the fixed solenoid 46, and the inner solenoid base 47 is connected to the fixed solenoid 46. The inner solenoid base 47 is limited and turned by the limiting unit B, and a second lens 12 can be placed inside the inner solenoid base 47.

A base ring 50 is placed inside the housing 20, and a protective lens 15 and a third lens 13 can be placed on its internal and external end.

Figure 6:
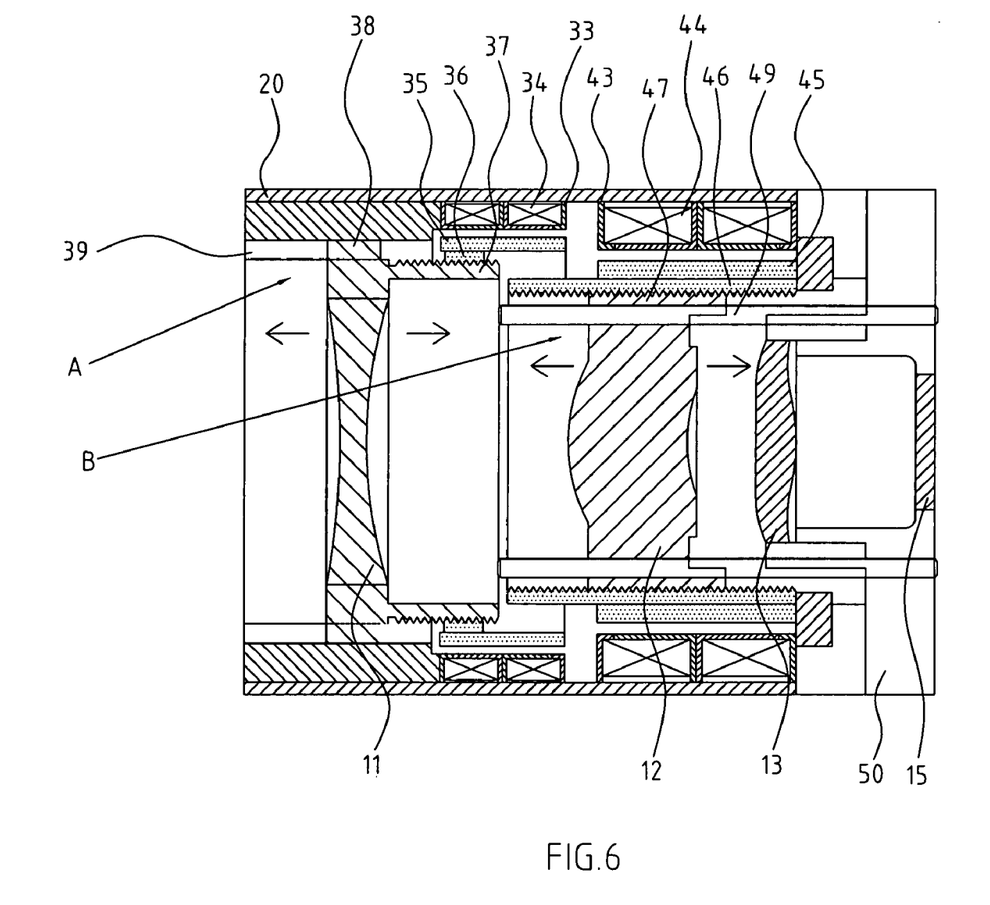
FIG. 6 shows a sectional view of the operation of the preferred embodiment of the present invention.
Figure 7:
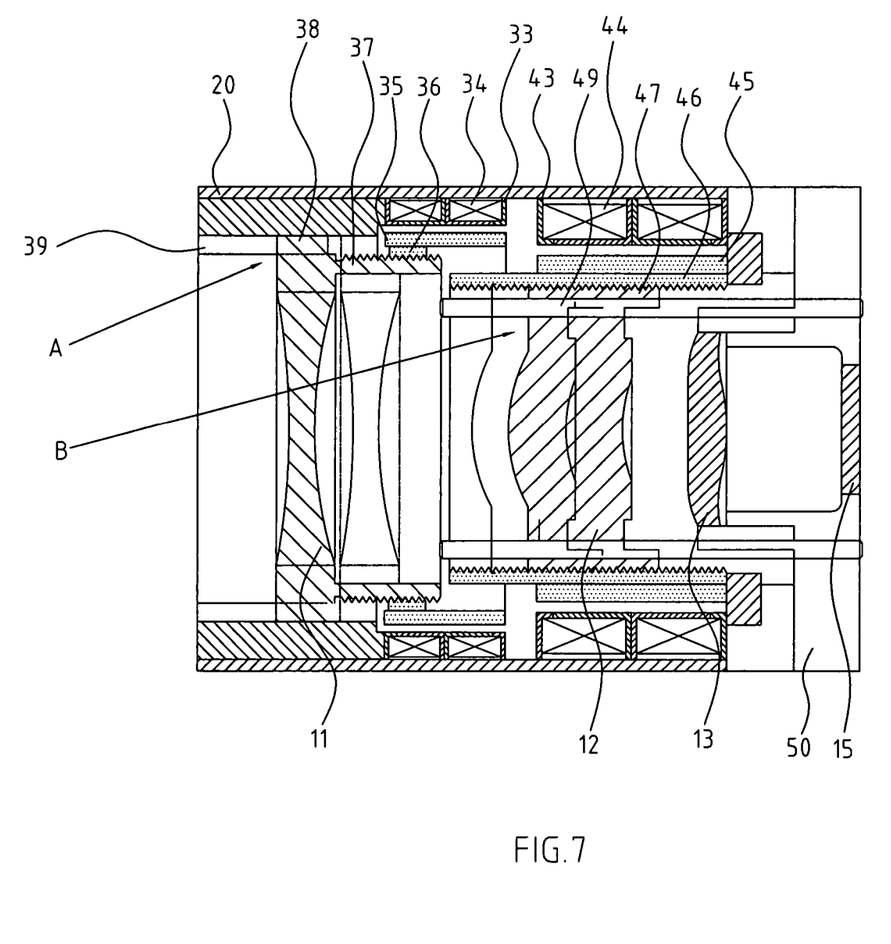
FIG. 7 shows another sectional view of the operation of the preferred embodiment of the present invention.

The built-in multidriver device comprised of the above-mentioned components provides the lens 11, 12, 13 of the zoom lens kit 10 with multi-sectional independent control by independent driver 30, 40, as shown in FIGS. 6 and 7.

Figure 1:
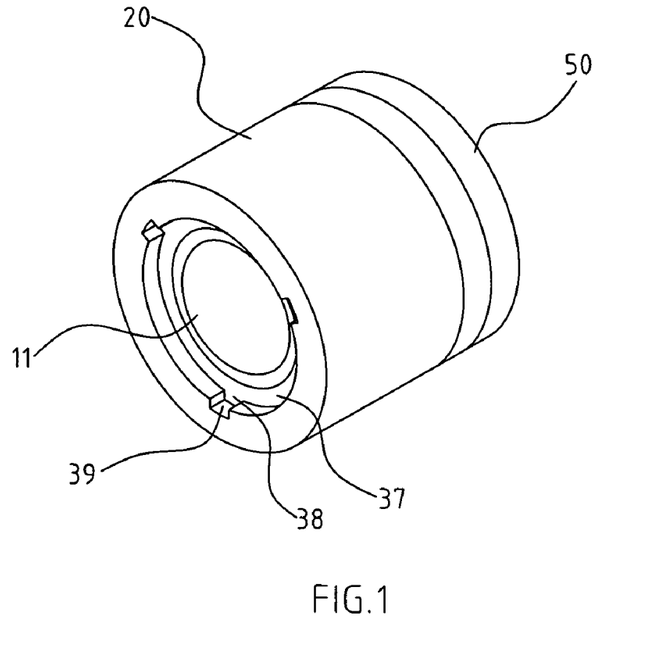
FIG. 1 shows an assembled perspective view of the preferred embodiment of the present invention.
Figure 2:
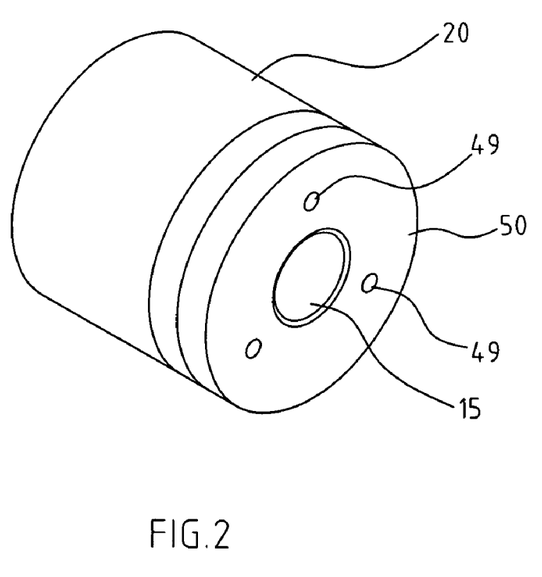
FIG. 2 shows another assembled perspective view of the preferred embodiment of the present invention.
Figure 3:
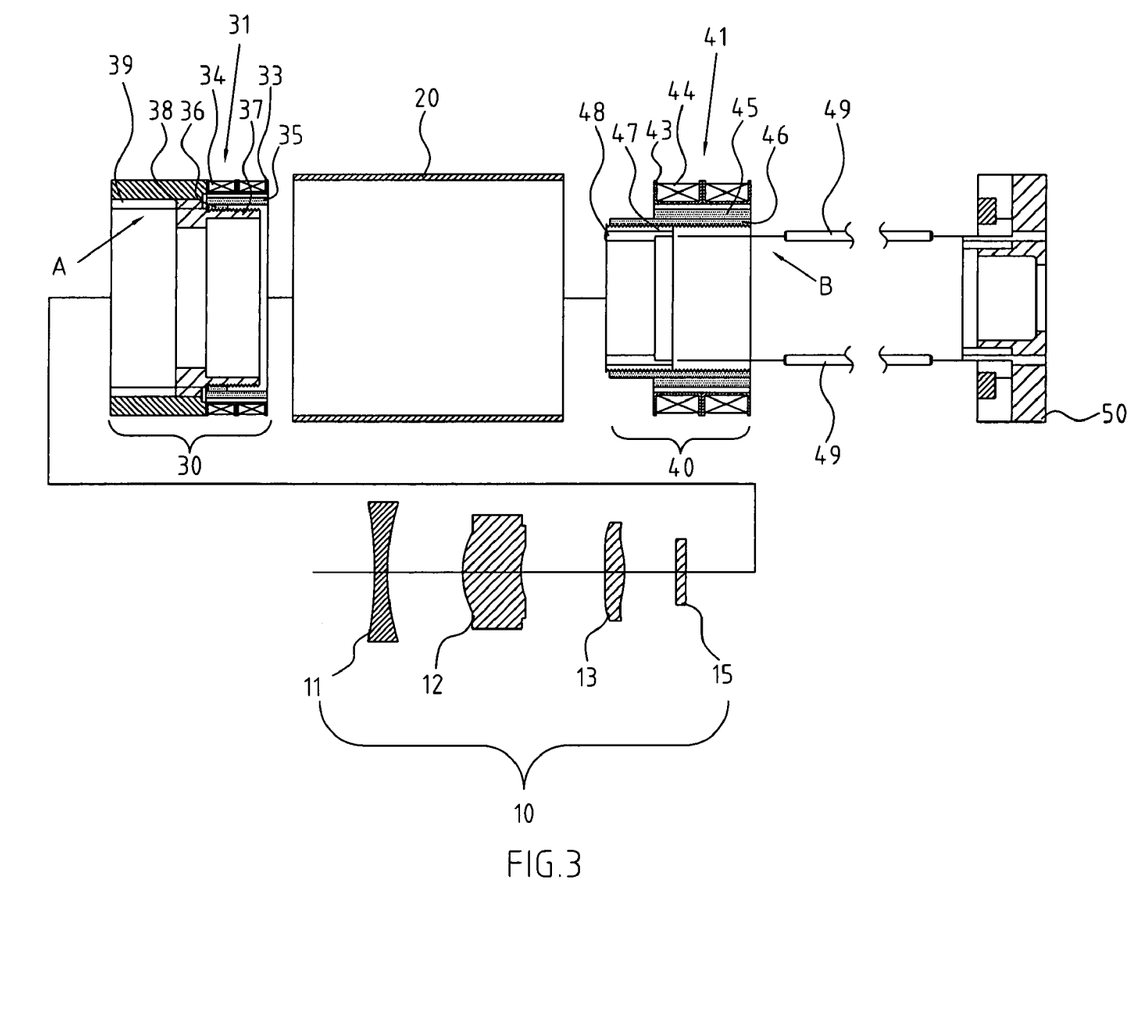
FIG. 3 shows a large part of an exploded sectional view of the preferred embodiment of the present invention.
Figure 4:
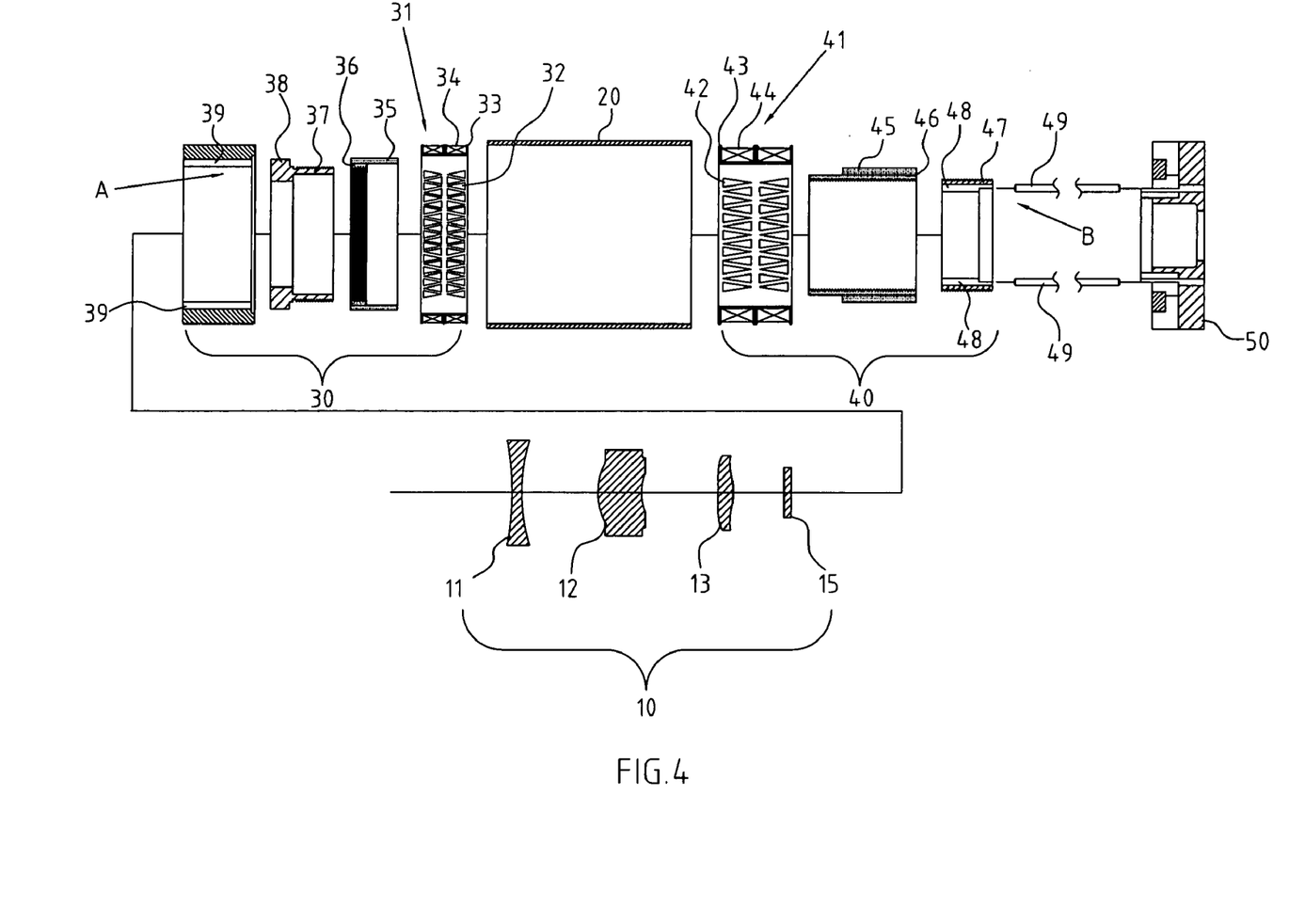
FIG. 4 shows a detailed part of the exploded sectional view of the preferred embodiment of the present invention.
Figure 5:
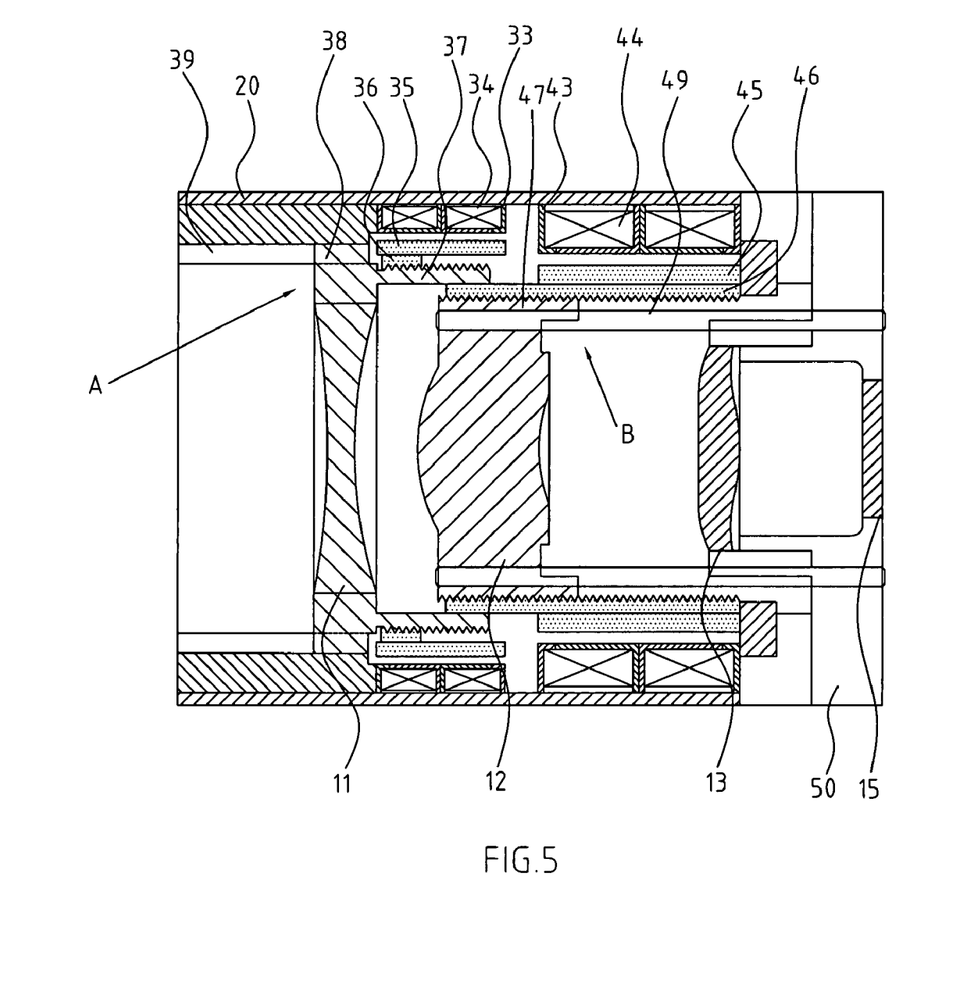
FIG. 5 shows the assembled sectional view of the preferred embodiment of the present invention.

In the built-in multidriver device as shown in FIGS. 3, 4, the coil stator 31, 41 for each driver 30, 40 is made in one piece with the magnetic permeable ring 33, 43 of the magnetic claw 32, 42 that bent inward. The coil 34, 44 is wrapped around the magnetic permeable ring 33, 43 to make coil stator 31, 41. The inside of the coil stator 31, 41 makes the magnetic rotor 35, 45 that has multiple poles to turned by the magnetic induction of the coil stator 31, 41. Moreover, each drive 30, 40 provides a limiting position for inner solenoid base 37, 47, and guides the limiting unit A, B to move axially. The limiting unit A, B also comprises limiting part 38 and limiting slot 39, or comprises the corresponding limiting hole 48 and guide rod 49, so that the guide slot 39 and guide rod 49 are placed on directly and indirectly on the housing 20.

Figure 8:
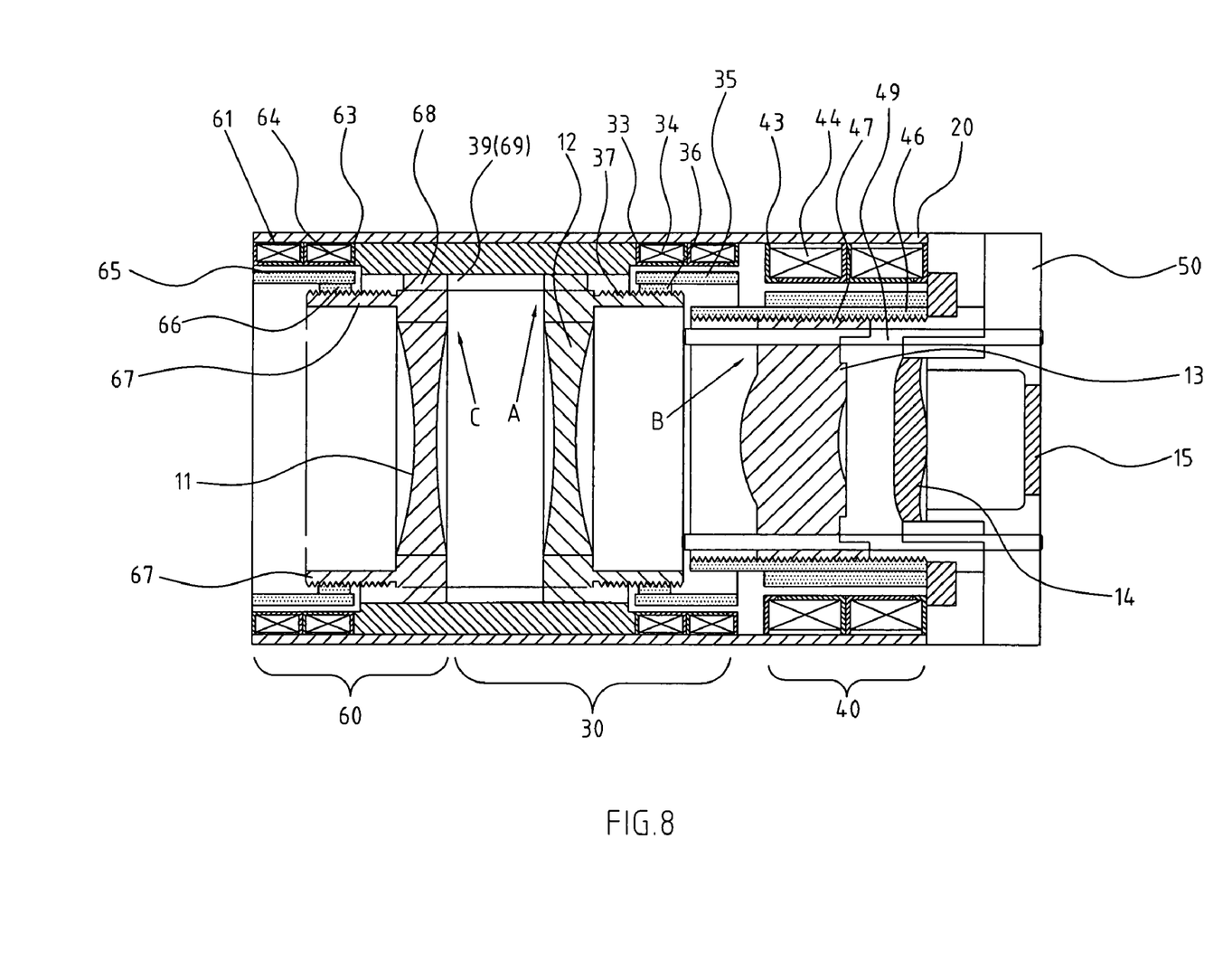
FIG. 8 shows an assembled sectional view of another preferred embodiment of the present invention.

As shown in FIG. 8, the zoom lens kit 10 has the fourth lens 14, and the built-in multidriver device adds a third driver. The third driver comprises a coil stator 61, a magnetic rotor 65, a fixed solenoid 66, an inner solenoid base 67, and a limiting unit C. The coil stator 61 is placed on the front end of extended housing 20, and the magnetic rotor 65 is connected to the fixed solenoid 66. The inner solenoid base 67 is connected to the fixed solenoid 66, and the inner solenoid base 67 is limited and turned by the limiting unit C. The first lens 11 of the zoom lens kit 10 can be placed inside the inner solenoid base 66, and the second, third, and fourth lens 12, 13, 14 is placed on the first driver device 30, second driver device 60, and base ring 50 accordingly. The third drive 60 provides a limiting position for inner solenoid base 67, and guides the limiting unit C to move axially, which also comprises limiting part 68 and limiting slot 69. The limiting unit C can be shared between the guide slot 69 and guide slot 39 of the first driver device 30.

Moreover, in the built-in multidriver device of the present invention, the lenses 11, 12, 13, 14, 15 that are placed inside the inner solenoid bases 37, 47, 67 of the drivers 30, 40, 60, and the base ring 50 can be replaced by group of lenses (not shown in the Figure), which can be the zoom lens kit 10 inside the built-in multidriver device.

Through the above structures, the operation of the present invention is explained as follows. As shown in FIGS. 3, 4, 5, 8, multiple lenses 11, 12, 13, 14, 15 of the zoom lens kit 10 or multiple sets of a lens kit (not shown in the figure), can be placed in each independent driver 30, 40, 60 to integrate the drivers 30, 40, 60. A lens kit 10 and a housing 20 are provided for each independent driver 30, 40, 60 to position accordingly and to make the built-in multidriver device. When the magnetic rotor 35, 45, 65 is turned by the magnetic induction of the coil stators 31, 41, 61, the fixed solenoid 36, 46, 66 turns in the inner solenoid base 37, 47, 67. The inner solenoid base 37, 47, 67 is limited by the limiting unit A B C, so that the inner solenoid base 37, 47, 67 is moved axially as shown in FIGS. 6 7. The multiple lenses 11, 12, 13, 14, 15 or multiple sets of lens kits of the zoom lens kit 10 are driven to zoom independently. Because the drivers 30, 40, 60 inside the housing 20 are independent, independent sections are formed, and each section zooms independently inside the built-in multidriver device.

We claim:

1. A built-in multidriver device for a camera zoom lens, said lens having an independent driver, each driver is being integrated into a lens mount, the built-in multidriver device comprising:

a housing, each independent driver being positioned therein accordingly;

a first driver device, being comprised of a first coil stator, a first magnetic rotor, a first fixed solenoid, a first inner solenoid base, and a first limited unit, said first coil stator being placed at a front section of an external end of said housing, said first magnetic rotor being connected to said first fixed solenoid, said first inner solenoid base is being connected to said first fixed solenoid, said first inner solenoid base is being limited and turned by said first limiting unit, said first inner solenoid base having a first lens placed therein;

a second driver device, being comprised of a second coil stator, a second magnetic rotor, a second fixed solenoid, a second inner solenoid base, and a second limited unit, said second coil stator being placed at a middle section of an external end of said housing, said second magnetic rotor being connected to said second fixed solenoid, said second inner solenoid base being connected to said second fixed solenoid, said second inner solenoid base being limited and turned by the limiting unit, said second inner solenoid base having a second lens placed therein; and a base ring, being placed inside said housing and having a protective lens and a third lens placed on an internal and external end thereof;

wherein said first lens, said second lens, and said third lens are formed in a zoom lens kit and wherein said zoom lens kit has a fourth lens, the built-in multidriver device farther comprising: a third driver, being comprised of a third coil stator, a third magnetic rotor, a third fixed solenoid, a third inner solenoid base, and a third limiting unit, said third coil stator being placed on a front end of an extended housing, said third magnetic rotor being connected to said third fixed solenoid, said third inner solenoid base being connected to said third fixed solenoid, said third inner solenoid base being limited and turned by said third limiting unit, said fourth lens being placed inside said third inner solenoid base.

2. The built-in multidriver device defined in claim 1, wherein each of said first and second coil stator for each driver is made in one piece with a magnetic permeable ring of a magnetic claw bent inward, said magnetic permeable ring having a coil wrapped therearound to make each coil stator, and wherein each of said first and second magnetic rotor is made by an inside of each coil stator having multiple poles to turned by magnetic induction of each coil stator.

3. The built-in multidriver device defined in claim 1, wherein each of said first and second driver provides a limiting position for each inner solenoid base, and guides each limiting unit to move axially, each limiting unit being comprised of a limiting part and limiting slot, or a corresponding limiting hole and guide rod, said limiting slot or guide rod being placed on directly and indirectly on said housing.

4. The built-in multidriver device defined in claim 1, wherein said third driver provides a limiting position for said third inner solenoid base, and guides said third limiting unit to move axially, said third limiting unit being comprised of a limiting part and limiting slot, said third limiting unit being shared between said limiting slot and guide rod of said first driver.

5. The built-in multidriver device defined in claim 1, wherein each lens is placed inside each inner solenoid base of each driver, respectively, and each lens is replaced by a group of lenses, said group of lenses being a zoom lens kit.

* * * * *

UNITED STATES PATENT AND TRADEMARK OFFICE
CERTIFICATE OF CORRECTION

PATENT NO. : 7,593,630 B2
APPLICATION NO. : 11/491660
DATED : September 22, 2009
INVENTOR(S) : Hsiao et al.

Page 1 of 1

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 529 days.

Signed and Sealed this

Twenty-first Day of September, 2010

David J. Kappos
*Director of the United States Patent and Trademark Office*